United States Patent

Mendez

[11] Patent Number: 6,120,824
[45] Date of Patent: *Sep. 19, 2000

[54] PROCESS FOR THE NATURAL ASEPTIC PACKAGING OF FRUIT PRODUCTS AND DAIRY PRODUCTS FOR EXTENDING SHELF LIFE WITHOUT REFRIGERATION

[76] Inventor: Alejandro Mendez, P.O. Box 523271, Miami, Fla. 33152

[*] Notice: This patent is subject to a terminal disclaimer.

[21] Appl. No.: 09/309,387

[22] Filed: Jun. 18, 1998

Related U.S. Application Data

[63] Continuation-in-part of application No. 08/823,813, Mar. 24, 1997, abandoned, which is a continuation of application No. 08/442,188, May 16, 1995, Pat. No. 5,614,238.

[51] Int. Cl.$^7$ .............................. A23B 7/005; A23B 2/46
[52] U.S. Cl. ...................... 426/397; 426/401; 426/407; 426/416; 426/521; 426/599; 426/615
[58] Field of Search .................................. 426/397, 401, 426/407, 416, 521, 599, 615

[56] References Cited

U.S. PATENT DOCUMENTS 2,561,784   7/1951   Garcia ...................................... 426/397
2,829,058   4/1958   Kazmi ...................................... 426/397
5,614,238   3/1997   Mendez .................................... 426/397

OTHER PUBLICATIONS

Hall et al. Milk Pasteurization, Westport, CT, pp. 123–129, 1968.

*Primary Examiner*—Helen Pratt
*Attorney, Agent, or Firm*—Brinkley, McNerney, Morgan, Solomon & Tatum, LLP

[57] ABSTRACT

The invention encompasses a method that kills, or renders organically inactive, the bacteria and enzymes, as well as any other non-pathogenic microorganisms present in fresh squeezed citrus and non-citrus fruit juices and fruit juice blends, as well as fruit pulps. The method includes the steps of bottling the product, dipping the bottle in a heated bath whereby the product is heated, capping the heated product, and allowing the product to cool to form a vacuum seal. The method produces the aseptic packaging of natural juice products having a shelf life extending from two to three years without the need for refrigeration, and without the use of artificial preservatives or additives. The process also preserves the natural taste, colors, and odors typically found in fresh squeezed juices and juice blends, an citrus pulp.

9 Claims, 4 Drawing Sheets

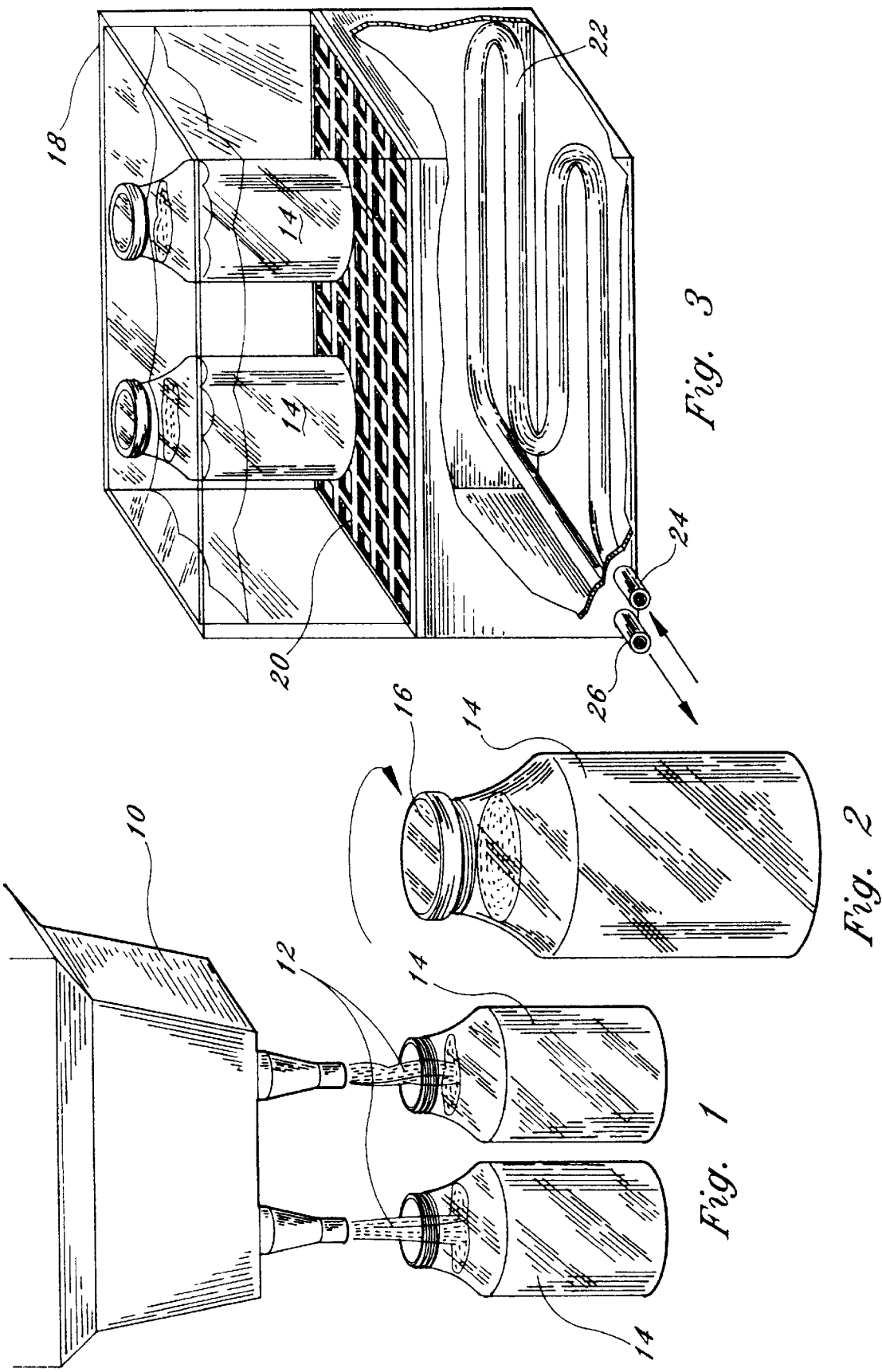

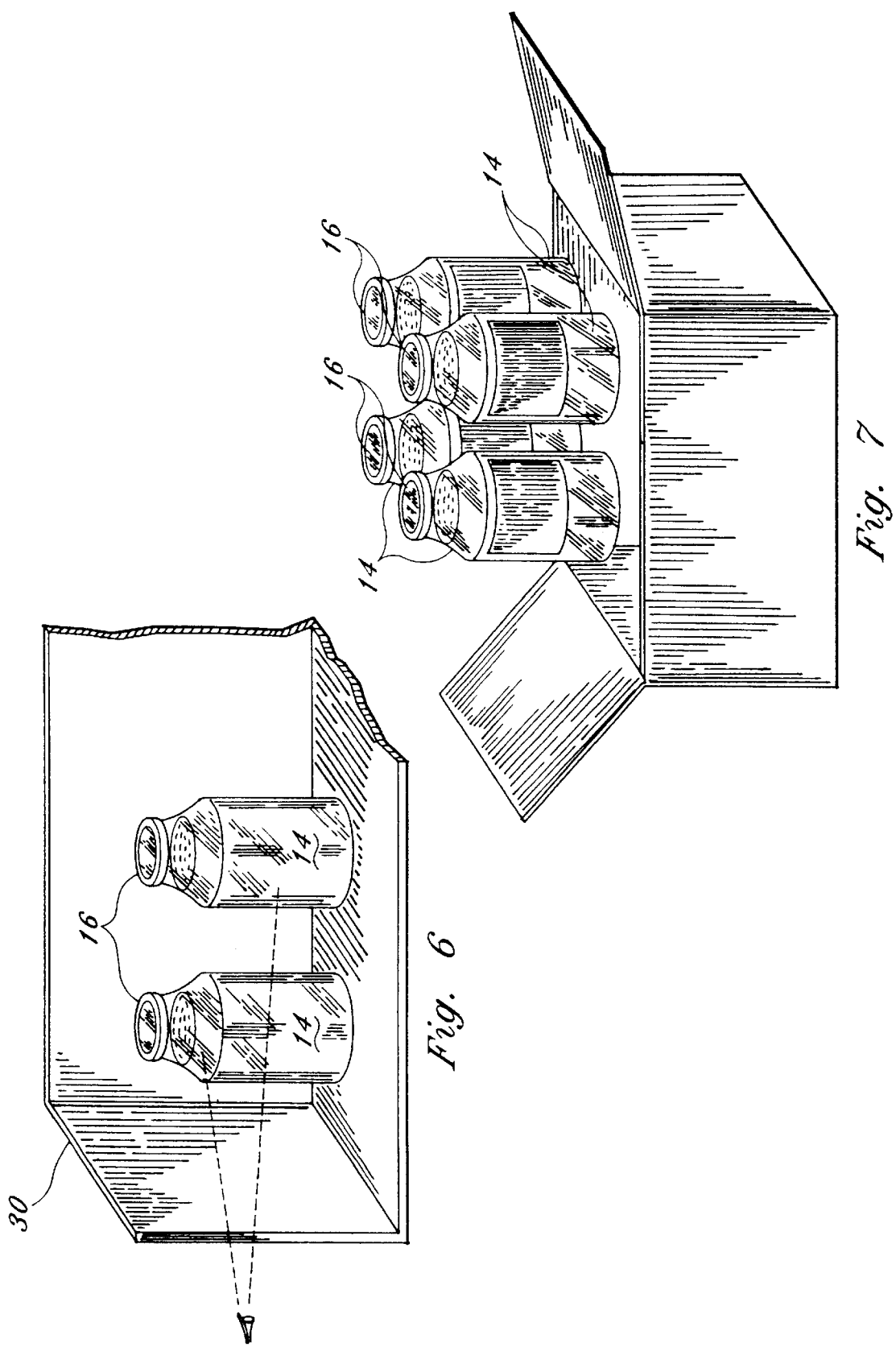

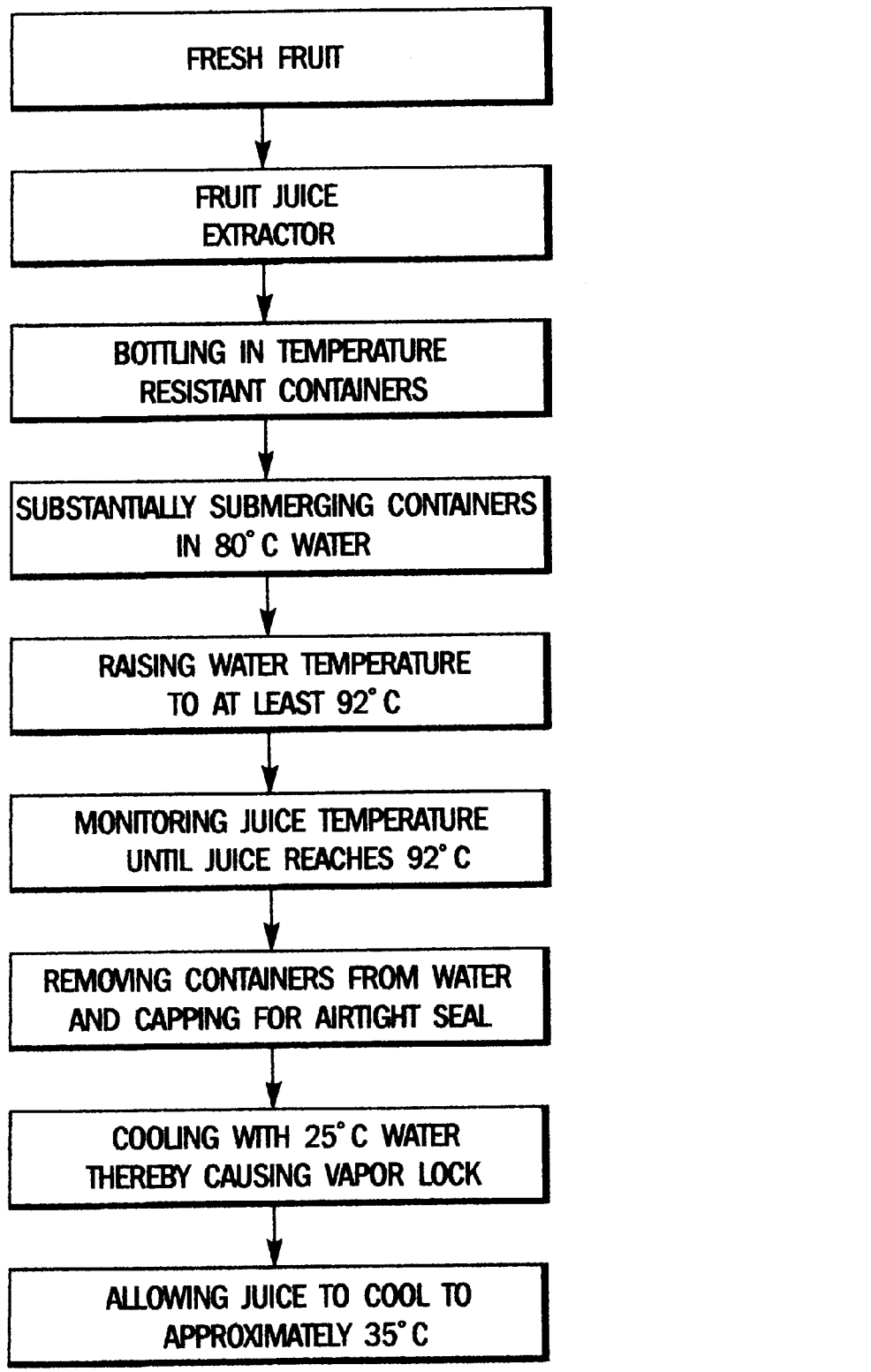

PROCESS FOR THE NATURAL ASEPTIC PACKAGING OF FRUIT PRODUCTS AND DAIRY PRODUCTS FOR EXTENDING SHELF LIFE WITHOUT REFRIGERATION

This application is a continuation-in-part of Ser. No. 08/823,813, filed Mar. 24, 1997, now abandoned which is a continuation of Ser. No. 08/442,188, filed May 16, 1995, now U.S. Pat. No. 5,614,238.

BACKGROUND OF THE INVENTION

1. Field of the Invention

The present invention is directed to a method for preserving fresh squeezed citrus and non-citrus fruit juices, fruit juice blends, fruit pulp, and dairy products and more particularly is directed to a thermal preservation process for aseptically packaging 100% pure fruit juices, juice blends, and fruit pulps, such that the packaged product has an extended shelf life of up to three years without refrigeration.

2. Description of the Prior Art

When fruits are harvested, microbiological and chemical changes occur which limit the time the fruit remains acceptable to the consumer and is safe for consumption. Since most of the postharvest changes in food lead to spoilage, various methods of food preservation are used to prolong the length of time for which the food, and especially fruit juices, retain quality add appeal.

In the days of simple farming communities, it was possible to live on locally grown fruits and vegetables and no highly organized methods of food preservation were necessary. In the modern world however, centers of world population are in towns and cities, often many miles from the main areas of food production. Thus, unless preserved, food deteriorates prior to reaching the consumer.

After harvesting, plant tissue is unable to prevent the attack of microorganisms such as bacteria, yeast, and molds, which break down the food structure and produce undesirable "off-flavors," discoloration, and odors. The number of organisms in an ounce of food can range from several hundred to twenty million or more and the organisms are capable of rapid multiplication, such that under certain conditions, their numbers can double every fifteen or twenty minutes.

Bacteria are minute microorganisms that are the most common cause of food spoilage. Generally, bacteria will either cause food spoilage, rendering the food unpleasant to eat, or in the case of pathogenic bacteria, such as *Staphylococcus aureus* or Clostridium botulinum, it will have far worse effects giving rise to food poisoning.

Food spoilage may also be caused by chemical substances known as enzymes which are always present in minute quantities in living materials. In fruit, enzymes are chemical catalysts which bring about the change of flavor and texture associated with ripening. Enzymes are also often responsible for the deterioration of fruits after harvesting, such as the browning of the cut surface of apples and pears caused by the oxidation of phenols in the enzyme phenolase. Enzymes can be rendered organically inactive by exposure to heat.

Thermal preservation techniques for rendering inactive bacteria and enzymes in fruit juices and citrus pulp typically rely on known, large scale, pasteurization techniques. Pasteurization is a mild heat treatment process, wherein a supply of food product is heated in stainless steel containers at temperatures normally less than 212° F. (100° C.). Although common pasteurization techniques destroy pathogenic organisms, they do not provide indefinite protection against microbiological spoilage.

Even an acidic product, such as fruit juice, requires protection from spoilage organisms such as acetobacter, whose growth can lead to cloudiness in the fruit juice product. Cloudiness in some citrus juice products is due to the presence of pectin, which occurs naturally in the fruit. If the natural pectolytic enzymes of the fruit are not destroyed, they degrade the pectin with the result that the juice becomes cloudy and often gels. Therefore, in order to destroy the pectolytic enzymes, most citrus juices are processed by flash pasteurizing in a plate heat exchanger at 203° F. (95° C.) for 30 seconds. However, while partially rendering enzymes organically inactive, this process degrades juice quality since the juice in contact with metallic heat exchanger elements is vastly overheated. Furthermore, the prior art methods have been found unsatisfactory for rendering the enzymes present in citrus and non-citrus fruit juices organically inactive or destroying bacteria and other pathogenic and non-pathogenic organisms.

As a result, certain fruit juices have not been made readily available to the consuming public due to the limited success of the prior art methods. For example, juices such as banana juice and pineapple juice are not found on store shelves packaged in a one hundred percent natural state. Oftentimes, the juice quality is compromised by the addition of various preservatives to maintain freshness and color.

Thus, there still exists a need for a thermal preservation process specifically designed for citrus and non-citrus fruit juices and fruit juice blends, citrus pulp, and dairy products, that provides aseptic packaging of these products in a one hundred percent natural state and results in an extended shelf life of up to three years without the need for refrigeration.

SUMMARY OF THE INVENTION

The instant invention teaches a process that kills, or renders organically inactive, one hundred percent of the bacteria and enzymes, as well as any other non-pathogenic microorganisms present in fresh squeezed citrus and non-citrus fruit juices and fruit juice blends, as well as fruit pulps, and dairy products such as milk. The process results in the aseptic packaging of one hundred percent natural juices having a shelf life extending from two to three years without the need for refrigeration, and without the use of artificial preservatives or additives. The process also preserves the natural taste, colors, and odors typically found in fresh squeezed juices and juice blends, and fruit pulp, and avoids the disadvantages of overheating experienced in plate heat exchangers.

The process includes: extracting the juice or pulp (hereinafter "juice") in a conventional manner using a juice extractor; immediately placing the extracted juice into temperature-resistant containers capable of withstanding temperatures up to 100° C.; substantially submerging the containers in a tank of water at room temperature; raising the temperature of the water in the tank to 100° C. within a time period of between five (5) and ten (10) minutes; monitoring the juice temperature until the juice reaches a minimum temperature of 92° C. (maximum temperature of 97° C.); allowing the juice to remain at a minimum temperature of 92° C. for at least two (2) minutes (maximum time of one (1) minute if juice temperature is approximately 97° C.); removing the containers from the water once the juice temperature reaches 92° C.; capping the containers in an airtight manner; immediately cooling down the containers to approximately 35° C. by rinsing with water at room temperature, thereby causing a vapor lock inside the individual bottles caused by the volumetric contraction of the enclosed vapor during cooling, and also preventing overheating. In addition, the processed juice may be allowed to stabilize for three days during which quality control checks detect any fermentation, contamination, leaks, or other defects with the vapor lock that has been created; and labeling, boxing, and shipping the containers for consumption.

Therefore it is an object of the instant invention to provide a thermal preservation method for citrus and non-citrus fruit juices, fruit juice blends, and fruit pulps, whereby 100 percent natural juice or pulp products may be aseptically packaged in air tight containers having an extended, non-refrigerated, shelf life of at least two years.

It is a further object of the instant invention to provide a thermal preservation method whereby juice and pulp products are prevented from overheating contact with heat exchanging apparatus.

Yet another object of the instant invention is to provide a thermal preservation process whereby juice and fruit pulp products are packaged prior to exposure to raised temperatures.

Still another object of the present invention is to provide a thermal preservation process whereby pre-packaged juice or pulp vents container vapor during the heating process and creates a vapor lock during the cooling process.

Yet another object of the instant invention is to provide a thermal preservation process suitable for use with dairy products such as milk.

In accordance with these and other objects which will become apparent hereinafter, the instant invention will now be described with particular reference to the accompanying drawings.

BRIEF DESCRIPTION OF THE DRAWINGS

FIG. 1 illustrates the container filling procedure.

FIG. 2 illustrates capping of a container.

FIG. 3 illustrates the containers submerged into a water bath and heating procedure wherein the water temperature is raised.

FIG. 6 illustrates the containers during the stabilization and inspection stage.

FIG. 7 illustrates the final labeling and packaging stage.

FIG. 8 is a flow chart of the instant process.

DESCRIPTION OF THE PREFERRED EMBODIMENTS

Figure 5:
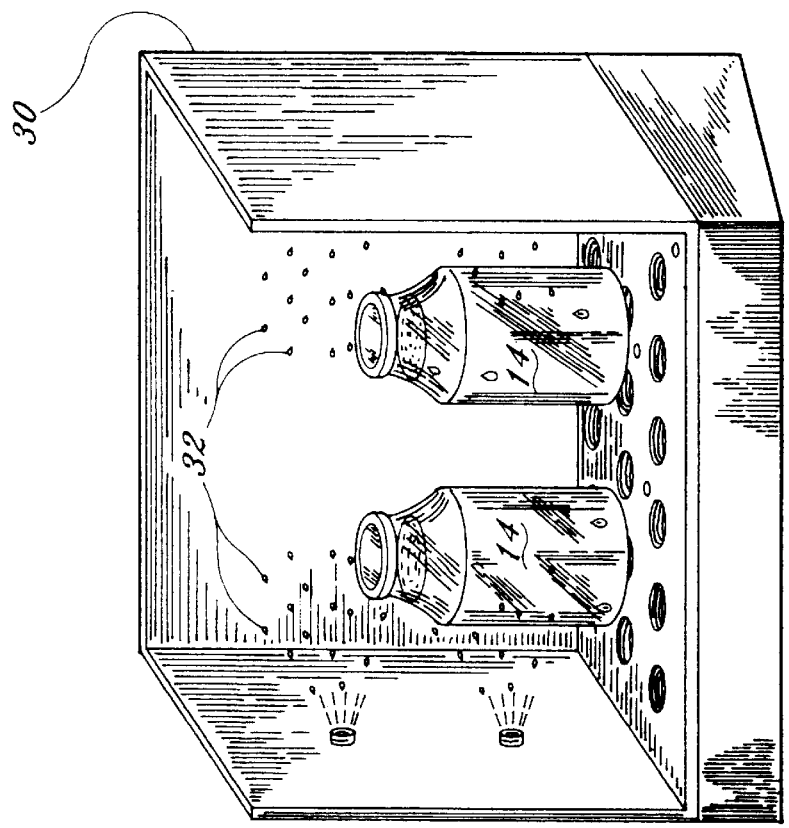
FIG. 5 illustrates cooling the containers with a water spray.

A process that kills, or renders organically inactive, one hundred percent of the bacteria and enzymes, as well as any other non-pathogenic microorganisms present in fresh squeezed citrus and non-citrus fruit juices and fruit juice blends, as well as fruit pulps. The process results in the aseptic packaging of one hundred percent natural juices having a shelf life extending from two to three years without the need for refrigeration, and without the use of artificial preservatives or additives. The process also preserves the natural taste, colors, and odors typically found in fresh squeezed juices and juice blends, and fruit pulp.

FIG. 8 is a flow chart of the process taught by the instant invention. The process includes the following steps. Extracting the juice or pulp using an appropriate extracting device as illustrated in FIG. 1. For example, a citrus juice extractor 10 may be utilized to extract juice and pulp from citrus including oranges, tangerines, and grapefruit. On the other hand, fruit, such as bananas, may require more specialized extracting devices. Regardless of the extraction method, 100 percent natural juice or pulp, shown generally as 12, is obtained.

The extracted juice, juice blend, or fruit pulp (hereinafter "product") is immediately bottled in temperature-resistant containers 14 capable of withstanding temperatures up to 100° C. In the preferred embodiment glass containers are used. It has been found that glass containers are particularly well suited for use with the instant process since the glass wall acts as a thermal insulator thereby protecting the product from exposure to extreme surface temperatures such as would be experienced by heating the product in a thin wall stainless steel container or plate heat exchanger.

As best seen in FIG. 2, the filled containers 14 may be capped with a suitable commercial cap 16, however, in the preferred embodiment the containers are not initially capped. In addition, as an alternative, the containers may be "partially capped" which refers to capping the container by imparting a partial turn to the cap such that the cap is semi-sealed and vapor and gas remaining in the container may escape during expansion.

As best shown in FIG. 3, the containers 14 are then substantially submerged in a tank 18 of water which is initially at room temperature. It has been found that submerging the container such that the exterior water level reaches approximately ⅔ to ¾ of the container height is optimum. Tank 18 is preferably constructed having an elevated, or double, bottom shown as 20, for elevating the containers above a heat exchanging means 22. In the preferred embodiment, the heat exchanging means includes a steam heat exchanger, having a steam inlet 24 and a steam outlet 26, submerged within tank 18 with heat supplied by superheated steam.

The temperature of the water in the tank is then raised to 80° C. over a period of approximately five (5) minutes. Thereafter, the temperature of the water in the tank is further raised to at least 92° C. over an additional two (2) minute period. As the temperature of the water in the tank is uniformly raised, temperature sensors (not shown) monitor the product temperature. To insure uniform product temperature rise, the product may be mixed by agitating the containers. The heat transfer process is terminated when the juice product reaches 92° C. (minimum), 97° C. maximum. The juice product, however, may be maintained at that temperature for a few (1–3) minutes, depending on the product, for rendering inactive organic matter such as bacteria and enzymes.

Figure 4:
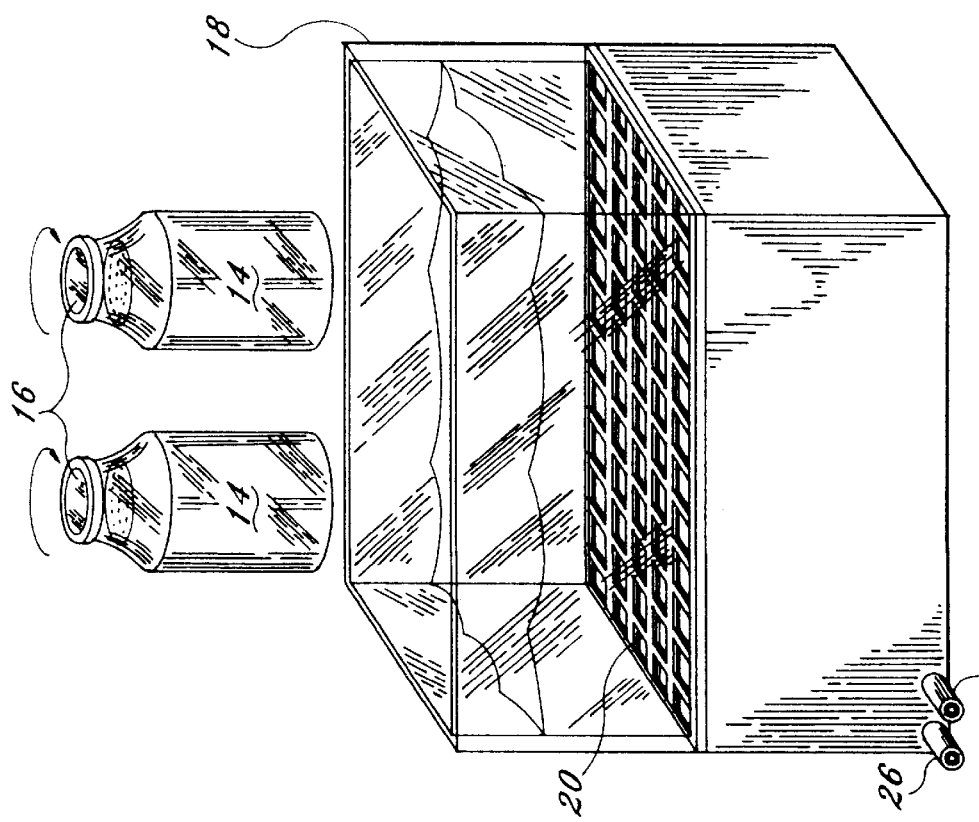
FIG. 4 illustrates a capping process forming an air tight seal.

The containers are then removed from the tank and capped if previously left uncapped, or "totally capped" as best illustrated in FIG. 4 if the partial capping method is used. "Totally capped" is defined as securing the cap in an air tight manner, typically by imparting an additional twist to the cap 16. As best depicted in FIG. 5, the product is then partially cooled on specially designed cooling racks 30, using a spray of room temperature water 32 (approximately 25° C.), thereby producing cooling induced volumetric contraction of the liquid and vapor in the containers which produces a vapor lock, thereby causing the pop-up portion of the pop-up cap to become depressed (not shown) indicating a positive seal. Once a vapor lock is achieved, the containers are allowed to further cool at ambient conditions to room temperature (approximately 35° C.).

As best illustrated in FIG. 6, the product should then be allowed to stabilize for approximately 3 days, during which time the product undergoes quality control inspections to detect any fermentation, contamination, leaks, or defects in the vapor lock seal.

The resulting product is then labeled, boxed and shipped for consumption as illustrated in FIG. 7. Product produced by the instant process has an extended shelf life of over 2 years without refrigeration. In addition, the instant process prevents discoloration resulting from oxidation The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A thermal preservation process for the aseptic packaging of 100 percent natural fruit juice, fruit pulp or fruit juice blend products resulting in a packaged product having an extended shelf life of up to three years without refrigeration, including the steps of:

bottling fruit juice, or fruit pulp or fruit juice blend products in a temperature-resistant container, said container capable of withstanding temperatures up to 100° C.;

substantially submerging said container in water;

raising the temperature of the water to at least 92° C.;

monitoring the product temperature until the product reaches between 92° C. and less than 100° C.;

removing said container after the product temperature reaches between 92° C. and less than 100° C. and wherein substantially all enzymes which cause cloudiness due to pectin are rendered organically inactive;

sealing the container in an airtight manner;

cooling down the container with water, thereby causing a vapor lock inside the container caused by the volumetric contraction of the container contents during cooling.

2. The thermal preservation process according to claim 1, further including the steps of:

cooling the container until the product reaches approximately, 35° C.;

allowing the product to stabilize for at least 24 hours during which quality control checks detect any fermentation, contamination, leaks, or other defects with the seal that has been created.

3. The thermal preservation process according to claim 1, wherein said container is made of glass.

4. A thermal preservation process for the aseptic packaging of 100 percent natural fruit juice, or fruit pulp, or fruit juice blend products resulting in a packaged product having an extended shelf life of up to three years without the need for refrigeration, said process including the steps of:

bottling fruit juice or fruit pulp or fruit juice blends in a temperature-resistant container, said container capable of withstanding temperatures up to 100° C.;

substantially submerging said container in water, said water having an initial temperature of approximately 25° C.;

raising the temperature of the water to at least 92° C. using at least a primary source of heat within a time period of approximately seven minutes;

monitoring the fruit product temperature until the fruit product reaches 92° C.;

draining said water from around said container after the product temperature reaches 92° C. wherein substantially all enzymes which cause cloudiness due to pectin are rendered organically inactive;

sealing the container in an airtight manner;

cooling the container with water, thereby causing a vapor lock inside the container caused by the volumetric contraction of the container contents during cooling.

5. A thermal preservation process for the aseptic packaging of 100 percent natural fruit juice, fruit pulp, and fruit juice blends, according to claim 4, wherein said product is fruit juice.

6. A thermal preservation process for the aseptic packaging of 100 percent natural fruit juice, fruit pulp, and fruit juice blends, according to claim 4, wherein said product is fruit pulp.

7. A thermal preservation process for the aseptic packaging of 100 percent natural fruit juice, fruit pulp, and fruit juice blends, according to claim 4, wherein said containers are made of glass.

8. A thermal preservation process for the aseptic packaging of 100 percent natural fruit juice, fruit pulp, and fruit juice blends, according to claim 4, wherein steam is used as the primary source of heat.

9. A thermal preservation process for the aseptic packaging of 100 percent natural fruit juice, or fruit pulp, or fruit juice blend products resulting in a packaged product having an extended shelf life of up to three years without the need for refrigeration, said process including the steps of:

bottling natural fruit juice, or fruit pulp or fruit juice blend products in a temperature-resistant container, said container capable of withstanding temperatures up to 100° C.;

substantially submerging said container in water, said water having an initial temperature of approximately 25° C.;

raising the temperature of the water to approximately 80° C. within a time period of approximately five minutes;

raising the temperature of the water from approximately 80° C. to at least 92° C. within a time period of approximately two minutes;

monitoring the fruit product temperature until the fruit product reaches at least 92° C.;

draining said water from around said container after the product temperature reaches at least 92° C. wherein substantially all of the enzymes which cause cloudiness due to pectin rendered organically inactive;

sealing the container in an airtight manner;

cooling the container with water, thereby causing a vapor lock inside the container caused by the volumetric contraction of the container contents during cooling.

* * * * *